US009960877B2

(12) United States Patent
Cordeiro et al.

(10) Patent No.: US 9,960,877 B2
(45) Date of Patent: May 1, 2018

(54) APPARATUS, SYSTEM AND METHOD OF BEAMFORMING

(71) Applicant: INTEL IP CORPORATION, Santa Clara, CA (US)

(72) Inventors: Carlos Cordeiro, Porland, OR (US); Assaf Kasher, Haifa (IL)

(73) Assignee: Inten IP Corporation, Santa Clara, CA (US)

( * ) Notice: Subject to any disclaimer, the term of this patent is extended or adjusted under 35 U.S.C. 154(b) by 201 days.

(21) Appl. No.: 14/864,949

(22) Filed: Sep. 25, 2015

(65) Prior Publication Data

US 2016/0323755 A1  Nov. 3, 2016

Related U.S. Application Data

(60) Provisional application No. 62/154,882, filed on Apr. 30, 2015.

(51) Int. Cl.
| | |
|---|---|
| *H04J 13/00* | (2011.01) |
| *H04W 16/28* | (2009.01) |
| *H04W 72/04* | (2009.01) |
| *H04B 7/06* | (2006.01) |
| *H04W 74/00* | (2009.01) |

(52) U.S. Cl.
CPC ........ *H04J 13/0014* (2013.01); *H04B 7/0617* (2013.01); *H04W 16/28* (2013.01); *H04W 72/046* (2013.01); *H04W 74/002* (2013.01)

(58) Field of Classification Search
None
See application file for complete search history.

(56) References Cited

U.S. PATENT DOCUMENTS

| | | | | |
|---|---|---|---|---|
| 9,119,186 | B2* | 8/2015 | Zhang | H04L 5/001 |
| 2009/0175205 | A1* | 7/2009 | Mathew | G06F 15/7842 |
| | | | | 370/281 |
| 2012/0120839 | A1* | 5/2012 | Liu | H04L 1/0026 |
| | | | | 370/252 |
| 2012/0309325 | A1* | 12/2012 | Carbone | H04B 1/40 |
| | | | | 455/73 |

(Continued)

FOREIGN PATENT DOCUMENTS

| | | |
|---|---|---|
| WO | 2014074894 A1 | 5/2014 |
| WO | 2016175949 A2 | 11/2016 |

OTHER PUBLICATIONS

Ming Tsang et al., "Coding the Beams: Improving Beamforming Training in mmWave Communication System", Stanford University Department of Electrical Engineering, arXiv:1104.1007v4, Aug. 1, 2012.*

(Continued)

*Primary Examiner* — Jeffrey M Rutkowski
*Assistant Examiner* — Jonathan B Wood
(74) *Attorney, Agent, or Firm* — Alliance IP, LLC

(57) ABSTRACT

Some demonstrative embodiments include apparatuses, devices, systems and methods of beamforming. For example, a first wireless station may be configured to communicate a plurality of Sector Level Sweep (SLS) frames with a second wireless station over a first channel; and to communicate a plurality of Beam Refinement Protocol (BRP) frames with the second wireless station over a bonded channel comprising the first channel and at least a second channel.

25 Claims, 8 Drawing Sheets

(56) References Cited

U.S. PATENT DOCUMENTS

| | | | | |
|---|---|---|---|---|
| 2013/0058239 | A1* | 3/2013 | Wang | H04B 7/0417 370/252 |
| 2013/0089000 | A1* | 4/2013 | Hansen | H04B 7/0851 370/254 |
| 2013/0308717 | A1* | 11/2013 | Maltsev | H04B 7/0417 375/267 |
| 2014/0177543 | A1 | 6/2014 | Cordeiro | |
| 2014/0185551 | A1 | 7/2014 | Sanderovich | |
| 2014/0307602 | A1* | 10/2014 | Seok | H04W 52/0216 370/311 |
| 2015/0009894 | A1* | 1/2015 | Vermani | H04L 1/0072 370/328 |
| 2015/0244432 | A1* | 8/2015 | Wang | H04B 7/0695 375/267 |
| 2015/0249929 | A1* | 9/2015 | Irie | H04B 7/0695 370/329 |
| 2015/0289147 | A1* | 10/2015 | Lou | H04B 7/0408 370/329 |
| 2016/0119043 | A1* | 4/2016 | Rajagopal | H04B 7/088 370/329 |
| 2016/0277087 | A1* | 9/2016 | Jo | H04B 7/0617 |
| 2017/0064583 | A1* | 3/2017 | Roy | H04W 36/0005 |

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

IEEE Std 802.11ad™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.

IEEE Std 802.11ac™-2013. IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz, Dec. 11, 2013, 424 pages.

Alireza Tarighat et al., "Framework for NG60 Channel Bonding", IEEE 802.11-15/0335r2, Mar. 9, 2015; slides 2-5.

International Search Report and Written Opinion in PCT Application No. PCT/US2016/024030 dated Jan. 13, 2017; 10 pages.

Thomas Nitsche et al., "IEEE 802.11ad: Directional 60 GHz Communication for Multi-Gbps Wi-Fi", in: IEEE communications Magazine, vol. 52, pp. 133-140 and figures 5-8.

* cited by examiner

Beam refinement protocol (BRP)

Sector level sweep (SLS)

APPARATUS, SYSTEM AND METHOD OF BEAMFORMING

CROSS REFERENCE

This Application claims the benefit of and priority from U.S. Provisional Patent Application No. 62/154,882 entitled "Apparatus, System and Method of Beamforming", filed Apr. 30, 2015, the entire disclosure of which is incorporated herein by reference.

TECHNICAL FIELD

Embodiments described herein generally relate to beamforming.

BACKGROUND

A wireless communication network in a millimeter-wave band may provide high-speed data access for users of wireless communication devices.

A beamforming procedure may be configured to steer a first directional antenna of a first wireless communication device, e.g., a beamforming initiator (BI), and a second directional antenna of a second wireless communication device, e.g., a beamforming responder (BR). The beamforming procedure may be performed, for example, to establish a high throughout communication link between the BI and the BR, e.g., at an acceptable communication range between the BR and the BI.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
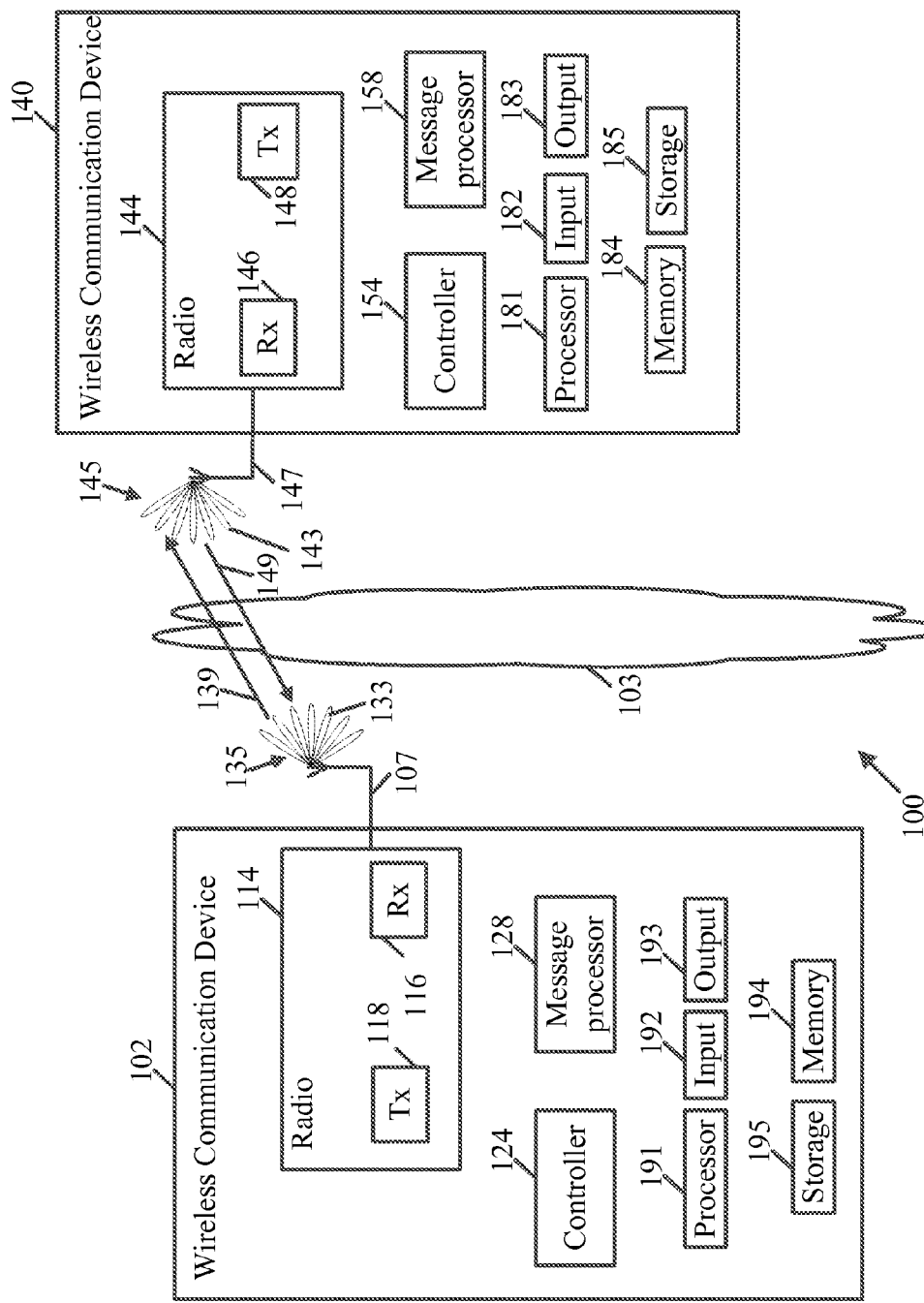
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2012 (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012); IEEE802.11 ac-2013 ("IEEE P802.11 ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012); IEEE-802.11REVmc ("IEEE 802.11-REVmcm/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); IEEE 802.11ax (IEEE 802.11ax, High Efficiency WLAN (HEW)); IEEE802.11-ay (P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz)) and/or future versions and/or derivatives thereof) and/or future versions and/or derivatives thereof, devices and/or networks operating in accordance with existing Wireless-Gigabit-Alliance (WGA) specifications (Wireless Gigabit Alliance, Inc WiGig MAC and PHY Specification Version 1.1, April 2011, Final specification) and/or future versions and/or derivatives thereof, devices and/or networks operating in accordance with existing Wireless Fidelity (WiFi) Alliance (WFA) Peer-to-Peer (P2P) specifications (WiFi P2P technical specification, version 1.5, Aug. 4, 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, devices and/or networks operating in accordance with existing Bluetooth (BT) specifications and/or protocols and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, roupg or), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., 7 Gigabit per second, or any other rate.

Some demonstrative embodiments may be implemented by a DMG STA (also referred to as a "mmWave STA (mSTA)"), which may include for example, a STA having a radio transmitter, which is capable of operating on a channel that is within the DMG band. The DMG STA may perform other additional or alternative functionality. Other embodiments may be implemented by any other apparatus, device and/or station.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a first wireless communication device 102, and/or a second wireless communication device 140.

In some demonstrative embodiments, device 102 and/or device 140 may include and/or perform the functionality of one or more STAs. For example, device 102 may include at least one STA, and/or device 140 may include at least one STA.

In some demonstrative embodiments, device 102 and/or device 140 may include, operate as, and/or perform the functionality of one or more DMG STAs. For example, device 102 may include at least one DMG STA, and/or device 140 may include at least one DMG STA.

In some demonstrative embodiments, device 102 and/or device 140 may be configured to operate as, and/or perform the functionality of, an access point (AP), e.g., a DMG AP, and/or a personal basic service set (PBSS) control point (PCP), e.g., a DMG PCP, for example, an AP/PCP STA, e.g., a DMG AP/PCP STA.

In some demonstrative embodiments, device 102 and/or device 140 may be configured to operate as, and/or perform the functionality of, a non-AP STA, e.g., a DMG non-AP STA, and/or a non-PCP STA, e.g., a DMG non-PCP STA, for example, a non-AP/PCP STA, e.g., a DMG non-AP/PCP STA.

In other embodiments, device 102 and/or device 140 may perform the functionality of any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

In some demonstrative embodiments, device 102 and/or device 140 may include a mobile device or a non-mobile, e.g., a static, device. For example, device 102 and/or device 140 may include, for example, a UE, an MD, a STA, an AP, a PC, a desktop computer, a mobile computer, a laptop computer, an Ultrabook™ computer, a notebook computer, a tablet computer, a wearable device, a server computer, a handheld computer, a handheld device, a sensor device, an Internet of Things (IoT) device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Device 102 and/or device 140 may optionally include other suitable additional or alternative hardware components and/or software components. In some demonstrative embodiments, some or all of the components of one or more of device 102 and/or device 140 may be enclosed in a common housing or packaging, and may be interconnected or operably associated using one or more wired or wireless links. In other embodiments, components of one or more of device 102 and/or device 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication device 102 and/or device 140 may be capable of communicating content, data, information and/or signals via a wireless medium (WM) 103. In some demonstrative embodiments, wireless medium 103 may include, for example, a radio channel, a cellular channel, an RF channel, a WiFi channel, an IR channel, a Bluetooth (BT) channel, a Global Navigation Satellite System (GNSS) Channel, and the like.

In some demonstrative embodiments, WM 103 may include one or more directional bands and/or channels. For example, WM 103 may include one or more millimeter-wave (mmWave) wireless communication bands and/or channels.

In some demonstrative embodiments, WM 103 may include one or more DMG channels. In other embodiments WM 103 may include any other directional channels.

In some demonstrative embodiments, device 102 and/or device 140 may include one or more radios including circuitry and/or logic to perform wireless communication between devices 102, 140 and/or one or more other wireless communication devices. For example, device 102 may include at least one radio 114, and/or device 140 may include at least one radio 144.

In some demonstrative embodiments, radio 114 and/or radio 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radio 114 and/or radio 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 148 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radio 114 and/or radio 144 may include, or may be associated with, one or more antennas 107 and/or 147, respectively.

In one example, device 102 may include a single antenna 107. In another example, device 102 may include two or more antennas 107.

In one example, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or 147 may include a directional antenna, which may be configured to be steered to a plurality of beam directions. For example, antenna 107 may be steered to a plurality of beam directions 135, and/or antenna 147 may be steered to a plurality of beam directions 145. For example, device 102 may transmit a directional transmission 139 to device 140, and/or device 140 may transmit a directional transmission 149 to device 102.

In some demonstrative embodiments, device 102 and/or device 140 may select a pair of beams including a first beam direction of the plurality of beam directions 135, e.g., including a direction 133, and a second beam direction of the plurality of beam directions 145, e.g., including a direction 143, to communicate between devices 102 and 140, for example, via a mmWave wireless communication link and/or any other link In some demonstrative embodiments, device 102 may include a controller 124, and/or device 140 may include a controller 154. Controllers 124 and/or 154 may be configured to perform one or more communications, may generate and/or communicate one or more messages and/or transmissions, and/or may perform one or more functionalities, operations and/or procedures between devices 102, 140 and/or one or more other devices, e.g., as described below.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

Some communications over a wireless communication band, for example, a DMG band or any other band, may be performed over a single channel bandwidth (BW). For example, the IEEE 802.11ad Specification defines a 60 GHz system with a single channel bandwidth (BW) of 2.16 GHz, which is to be used by all Stations (STAs) for both transmission and reception.

In some demonstrative embodiments, device 102 and/or device 140 may be configured to implement one or more mechanisms, which may, for example, enable to extend a single-channel BW scheme, e.g., a scheme in accordance with the IEEE 802.11 ad Specification or any other scheme, for higher data rates and/or increased capabilities, e.g., as described below.

In some demonstrative embodiments, device 102 and/or device 140 may be configured to implement one or more channel bonding mechanisms, which may, for example, support communication over bonded channels.

In some demonstrative embodiments, the channel bonding may include, for example, a mechanism and/or an operation whereby two or more channels can be combined, e.g., for a higher bandwidth of packet transmission, for example, to enable achieving higher data rates, e.g., when compared to transmissions over a single channel.

In some demonstrative embodiments, device 102 and/or device 140 may be configured to implement one or more channel bonding mechanisms, which may, for example, support an increased channel bandwidth, for example, a channel BW of 4.32 GHz, a channel BW of 6.48 GHz, and/or any other additional or alternative channel BW.

In some demonstrative embodiments, communication over a DMG band, for example, a 60 GHz band may be directional.

In some demonstrative embodiments, a beamforming (BF) link between two stations (STAs), e.g., devices 102 and 140, may be established, for example, before data communication may take place between the two STAs.

In some demonstrative embodiments, device 102 and/or device 140 may select a pair of beams including a first beam direction of the plurality of beam directions 135, e.g., including a direction 133, and a second beam direction of the plurality of beam directions 145, e.g., including a direction 143, to communicate between devices 102 and 140 via a mmWave wireless communication link.

In some demonstrative embodiments, device 102 and/or device 140 may perform a beamforming procedure (also referred to as "beamforming training protocol" or "beamforming protocol"), for example, to select the pair of beams including beam directions 133 and 143.

In some demonstrative embodiments, system 100 may include a beamforming initiator (BI) and a beamforming responder (BR) to perform beamforming between the BI and the BR. For example, wireless communication device 102 may perform the functionality of the BI, and/or wireless communication device 140 may perform the functionality of the BR.

In other embodiments, wireless communication device 140 may perform the functionality of the BI, and/or wireless communication device 102 may perform the functionality of the BR.

In some demonstrative embodiments, the beamforming procedure may include a Sector level sweep (SLS) phase or protocol, e.g., including, for example, an Initiator Sector Sweep (ISS), which may include a sector sweep performed, for example, by the Beamforming initiator, and a responder sector sweep (RSS), which may include a sector sweep performed, for example, by the Beamforming responder. The RSS may, for example, follow the ISS.

In some demonstrative embodiments, the beamforming procedure may include a Beam Refinement Protocol (BRP) phase, e.g., following the SLS phase In some demonstrative embodiments, device 102 and/or device 140 may opt to perform the BRP phase.

Some demonstrative embodiments are described herein with respect to a BRP, which may be performed after a SLS phase of a beamforming procedure. However, in other embodiments, BRP may be performed as part of any other phase and/or procedure.

In some demonstrative embodiments, device 102 and/or device 140 may exchange a plurality of BRP frames during the BRP phase. For example, device 102 may transmit one or more, e.g., a plurality of, BRP frames to device 140, and/or device 140 may transmit one or more, e.g., a plurality of, BRP frames to device 102.

In some demonstrative embodiments, one of devices 102 and 140 may perform the functionality of a BRP initiator to initiate the exchange of the BRP frames, and another one of devices 102 and 140 may perform the functionality of a BRP responder. In one example, device 102 may perform the functionality of the BRP initiator and/or device 140 may perform the functionality of the BRP responder.

Figure 2:
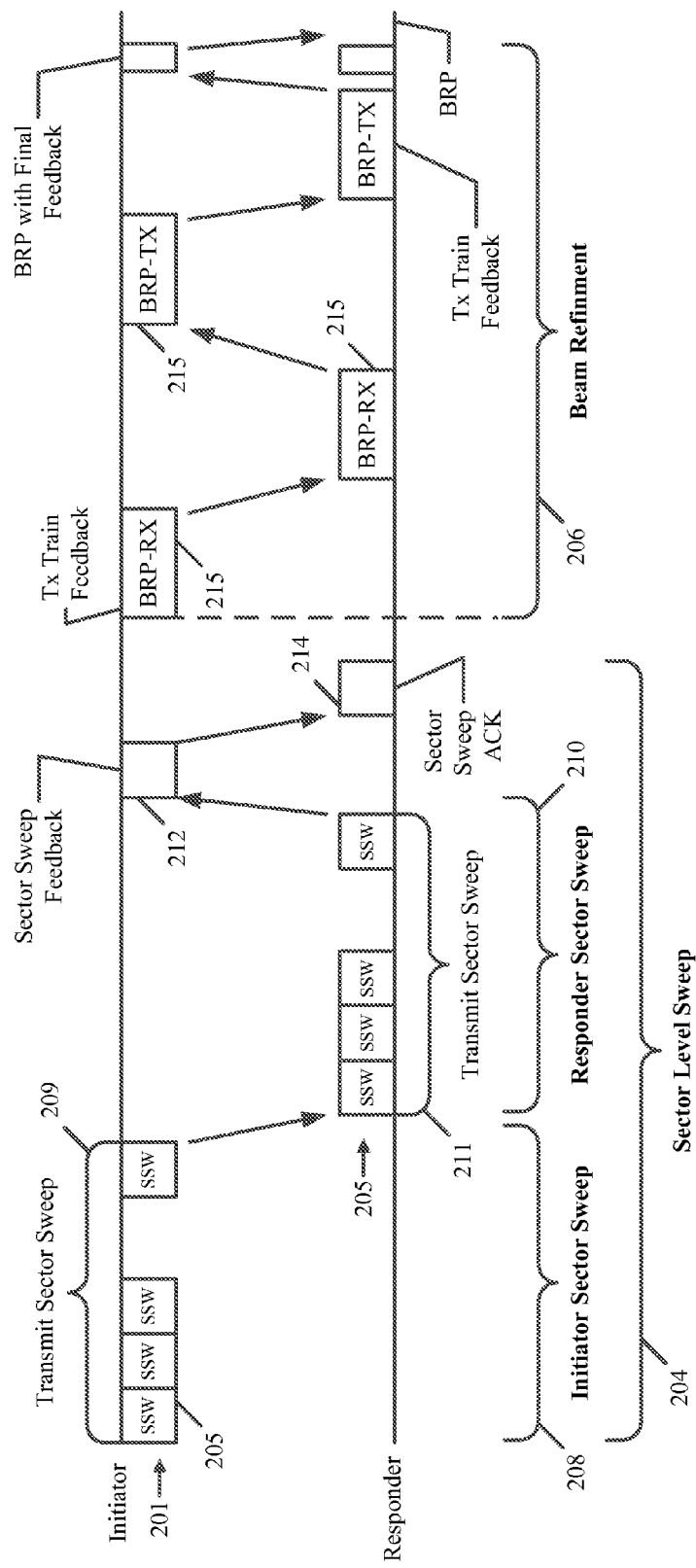
FIG. 2 is a schematic illustration of operations of a beamforming protocol, in accordance with some demonstrative embodiments.

Reference is made to FIG. 2, which schematically illustrates a beamforming protocol 200 between a BI 202 and a BR 240, in accordance with some demonstrative embodiments. For example, BI 202 may perform the functionality of device 102 (FIG. 1), and/or BR 240 may perform the functionality of device 140 (FIG. 1).

In some demonstrative embodiments, BI 202 and BR 240 may perform beamforming protocol 200, for example, to select the pair of beam directions 133 and 143 (FIG. 1).

As shown in FIG. 2, beamforming protocol 200 may include two phases, e.g., a sector level sweep (SLS) phase 204, and a beam refinement protocol (BRP) 206.

In some demonstrative embodiments, as shown in FIG. 2, BI 202 and BR 240 may first perform SLS phase 204, for example, to discover coarse sectors for communication, e.g., as described below with reference to FIG. 3A.

In some demonstrative embodiments, as shown in FIG. 2, BI 202 and BR 240 may perform BRP phase 206, for example, once SLS phase 204 is complete.

In some demonstrative embodiments, BI 202 and BR 240 may perform the BRP phase 206, for example, to fine tune the coarse sectors, e.g., as described below with reference to FIG. 3B.

In one example, BI 202 and BR 240 may perform BRP phase 206, for example, to achieve higher Signal to Noise Ratio (SNR) and/or to achieve any other goal.

As shown in FIG. 2, BI 202 and BR 204 may communicate a plurality of Sector Level Sweep (SLS) frames 205 (also referred to as "Sector Sweep (SSW) frames) during SLS phase 204, for example, to discover coarse sectors for communication.

As shown in FIG. 2, SLS phase 204 may include an Initiator Sector Sweep (ISS) 208, which may include a sector sweep performed, for example, by BI 202.

As shown in FIG. 2, BI 202 may transmit SSW frames 205 during Initiator Sector Sweep (ISS) 208, for example, by performing a transmit sector sweep (Tx SSW) 209.

As shown in FIG. 2, SLS phase 204 may include a Responder Sector Sweep (RSS) 210, which may include a sector sweep performed, for example, by BR 240.

As shown in FIG. 2, BR 240 may transmit SSW frames 205 during Responder Sector Sweep (RSS) 210, for example, by performing a transmit sector sweep (Tx SSW) 211.

As shown in FIG. 2, BI 202 may transmit a Sector Sweep Feedback frame 212 to BR 240, and BR 240 may transmit a Sector Sweep acknowledge (ACK) frame 214, e.g., to acknowledge receipt of Sector Sweep Feedback frame 212.

As shown in FIG. 2, BI 202 and BR 204 may communicate a plurality of BRP frames 215 during the BRP phase 206, for example, to fine tune the coarse sectors.

Figure 3B:
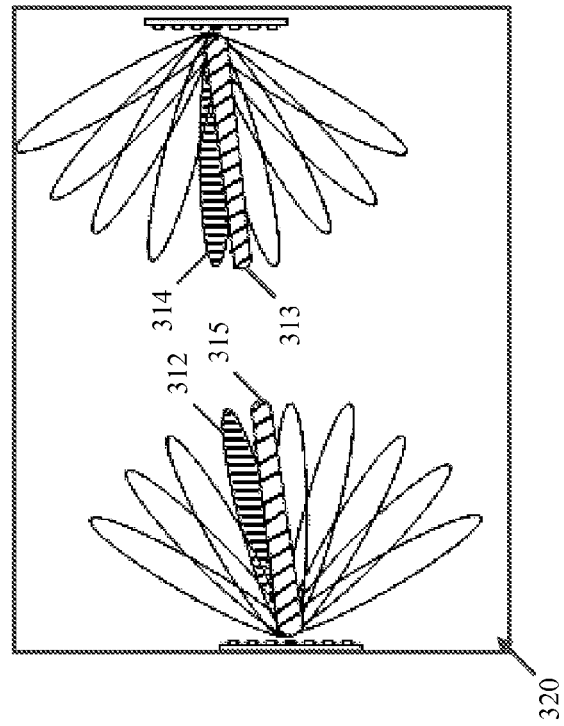
FIG. 3B is a schematic illustration of a Beam Refinement Protocol (BRP), in accordance with some demonstrative embodiments.
Figure 3A:
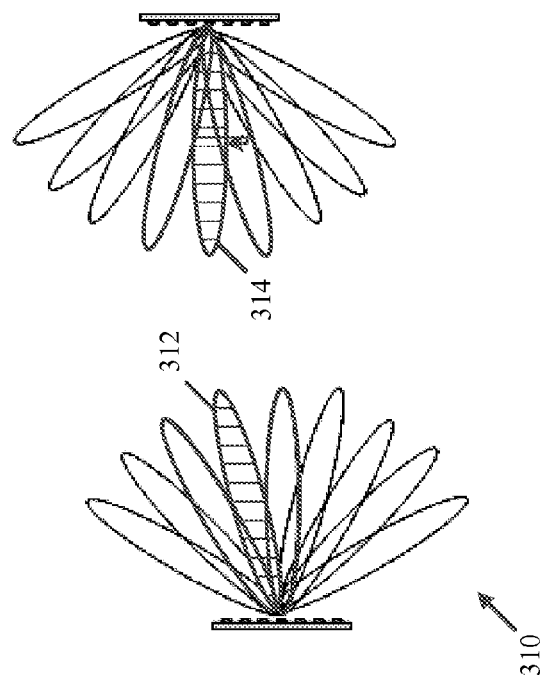
FIG. 3A is a schematic illustration of a Sector level Sweep (SLS) protocol, in accordance with some demonstrative embodiments.

Reference is made to FIG. 3A, which schematically illustrates a Sector level Sweep (SLS) protocol 310, in accordance with some demonstrative embodiments.

In some demonstrative embodiments, devices 102 and 140 (FIG. 1) may implement Sector level Sweep (SLS) protocol 310, e.g., by performing sector level sweep 204 (FIG. 2), for example, to discover coarse sectors 312 and 314 for communication between devices 102 and 140 (FIG. 1).

Reference is made to FIG. 3B, which schematically illustrates a Beam Refinement Protocol (BRP) 320, in accordance with some demonstrative embodiments.

In some demonstrative embodiments, devices 102 and 140 (FIG. 1) may implement Beam Refinement Protocol (BRP) 320, for example, to fine tune coarse sectors 312 and 314, e.g., into beam directions 313 and 315, respectively, for example, to communicate between devices 102 and 140 (FIG. 1).

Referring back to FIG. 1, in some demonstrative embodiments, a single channel BW BF protocol, for example, according to the IEEE 8021.11ad Specification, may not be suitable for an increased BW channel, e.g., a bonded channel.

For example, an antenna weight vector (AWV), which may be selected by a first STA to communicate between the first STA and a second STAs, over a single 2.16 GHz channel may likely be invalid, for example, when used over a 2.32 GHz or 6.48 GHz channel to communicate between the first and second STAs.

In some demonstrative embodiments, device 102 and/or device 140 may be configured to perform beamforming with channel bonding over a mmWave band, e.g., over a 60 GHZ band.

In some demonstrative embodiments, some implementations may enable a first STA to use an AWV of a single channel to communicate with a second STA, for example, to communicate with the second STA over a bonded channel, e.g., as described below.

In some demonstrative embodiments, given the coarse nature of the SLS, the same sector, which may be chosen as part of the SLS phase over a 2.16 GHz channel to communicate with a STA, may be used to communicate with the same STA over a bonded channel, e.g., as described below.

In some demonstrative embodiments, an increased channel BW BF protocol (also referred to as "bonded channel BF protocol") may be configured, for example, as an extension of a single-channel BW BF protocol.

In some demonstrative embodiments, the bonded channel BF protocol may be configured, for example, based on the finding that the same AWV of a single channel to communicate with a STA, may be implemented to communicate with the same STA over a bonded channel; and/or that the same sector that is chosen as part of the SLS phase over a 2.16 GHz channel to communicate with a STA may be used to communicate with the same STA over a bonded channel, e.g., as described below.

In some demonstrative embodiments, the single channel BW BF protocol, e.g., according to the IEEE 802.11ad Specification, or any other single-channel BF protocol, may be modified, for example, to support transmissions over a bonded channel, e.g., as described below.

In some demonstrative embodiments, a procedure and/or protocol for BF with channel bonding may include one or more operations and/or communications, e.g., as described below.

In some demonstrative embodiments, first and second STAs, e.g., device 102 and/or device 140, may be configured to perform the SLS phase, e.g., SLS phase 204 (FIG. 2), over a single BW channel, e.g., the 2.16 GHz channel, or any other channel, for example, prior to channel bonding, e.g., as described below.

In some demonstrative embodiments, the first and second STAs, e.g., device 102 and/or device 140, may perform the SLS phase, e.g., SLS phase 204 (FIG. 2), over the single channel BW, for example, to ensure that the first and second STAs determine a Transmit (Tx) sector, for example, the best TX sector, for communication, e.g., before attempting to use the channel bonding. For example, device 102 and/or device 140 may perform the SLS phase 204 (FIG. 2) to select coarse sectors 312 and 314 (FIG. 3) for communication between device 102 and device 140.

In some demonstrative embodiments, the first and second STAs, e.g., device 102 and/or device 140, may be configured to perform the BRP phase, e.g., BRP phase 206 (FIG. 2), over a bonded channel, e.g., as described below.

In some demonstrative embodiments, the first and second STAs, e.g., device 102 and/or device 140, may be configured to reserve a duration corresponding to the BRP.

In one example, the first and second STAs, e.g., device 102 and/or device 140, may be configured to implement a protection/reservation mechanism, for example, to indicate to one or more other STAs ("legacy STAs") not to attempt to communicate over the bonded channel during the duration of the BRP.

For example, the first and second STAs, e.g., device 102 and/or device 140, may be configured to implement a Request to Send (RTS)/Clear to Send (CTS), e.g., DMG CTS, mechanism, for example, prior to performing the BRP phase over the bonded channel, e.g., to enable setting a network Allocation vector (NAV) at the legacy STAs with respect to the duration of the BRP phase, e.g., as described below.

In some demonstrative embodiments, controller 124 may be configured to control, cause and/or trigger radio 114 to communicate a plurality of SLS frames with device 140 over a first channel.

In some demonstrative embodiments, controller 154 may be configured to control, cause and/or trigger radio 144 to communicate the plurality of SLS frames with device 102 over the first channel.

In some demonstrative embodiments, the first channel may include a 2.16 Gigahertz (GHz) channel.

In some demonstrative embodiments, device 102 and/or device 140 may be configured to communicate a plurality of BRP frames, e.g., as described below.

In some demonstrative embodiments, controller 124 may be configured to control, cause and/or trigger radio 114 to communicate the plurality of BRP frames with device 140 over a bonded channel including the first channel and at least a second channel, e.g., as described below.

In some demonstrative embodiments, controller 154 may be configured to control, cause and/or trigger radio 144 to communicate the plurality of BRP frames with device 102 over the bonded channel, e.g., as described below.

In some demonstrative embodiments, controller 124 may be configured to determine and/or select a sector of device 102 based on the SLS frames over the first channel. For example, controller 124 may determine sector 314 (FIG. 3A) based on SLS frames 205 (FIG. 2).

In some demonstrative embodiments, controller 124 may be configured to use the sector to communicate the BRP frames over the bonded channel. For example, controller 124 may be configured to control, cause and/or trigger radio 114 to communicate the BRP frames over the bonded channel, e.g., using sector 314 (FIG. 3A).

In some demonstrative embodiments, device 102 and/or device 140 may be configured to communicate one or more reservation frames to reserve wireless medium 103 for at least a duration of a BRP phase, e.g., as described below.

In some demonstrative embodiments, controller 124 may be configured to control, cause and/or trigger radio 114 to communicate with radio 144 one or more reservation frames to reserve wireless medium 103 for at least a duration of the BRP phase during which the BRP frames may be communicated.

In some demonstrative embodiments, controller 154 may be configured to control, cause and/or trigger radio 144 to communicate with radio 102 the one or more reservation frames to reserve wireless medium 103 for the duration of the BRP phase.

In some demonstrative embodiments, controller 124 may be configured to control, cause and/or trigger radio 114 to communicate the reservation frames over a plurality of channels including the first and second channels.

In some demonstrative embodiments, controller 154 may be configured to control, cause and/or trigger radio 144 to communicate the reservation frames over the plurality of channels.

In some demonstrative embodiments, device 102 and/or device 140 may be configured to communicate a plurality of Request to Send (RTS) frames, and a plurality of Clear to Send (CTS), e.g., as described below.

In some demonstrative embodiments, controller 124 may be configured to control, cause and/or trigger radio 114 to transmit the plurality of RTS frames, and to process receipt of the plurality of CTS frames, for example, subsequent to the SLS frames and prior to the BRP frames.

In some demonstrative embodiments, controller 154 may be configured to control, cause and/or trigger radio 144 to process receipt of the plurality of RTS frames, and to transmit the plurality of CTS frames, for example, subsequent to the SLS frames and prior to the BRP frames.

In some demonstrative embodiments, controller 124 may be configured to control, cause and/or trigger radio 114 to transmit the plurality of RTS frames over a respective plurality of channels including the first and second channels.

In some demonstrative embodiments, controller 154 may be configured to control, cause and/or trigger radio 144 to process receipt of the plurality of RTS frames over the respective plurality of channels including the first and second channels.

In some demonstrative embodiments, controller 154 may be configured to control, cause and/or trigger radio 144 to transmit two or more CTS frames over the respective ones of the first and second channels.

In some demonstrative embodiments, controller 124 may be configured to control, cause and/or trigger radio 114 to process receipt of one or more of the two or more CTS frames over respective ones of the first and second channels.

In some demonstrative embodiments, the plurality of channels may include one or more channels in addition to the first and second channels.

In some demonstrative embodiments, the bonded channel may include at least the first channel, the second channel, and a third channel.

According to these embodiments, the first channel, e.g., over which the SLS phase may be performed, may be between the second channel and the third channel. For example, controller 124 and/or controller 154 may be configured to select the channel to be used to perform the SLS phase, for example, to include a channel, which is at the center of an available frequency band and/or at the center of the bonded channel.

In other embodiments, the bonded channel may include any other number of channels, e.g., greater than three, and/or any other channel may be selected to be used to perform the SLS phase.

In one example, transmitter 118 may transmit to device 140 a first RTS frame over the first channel, a second RTS frame over a second channel, and a third RTS frame over a third channel, for example, to reserve the first, second, and third channels during the BRP phase.

In some demonstrative embodiments, device 140 may receive the first second and/or third RTS frames over the first, second and/or third channels, respectively.

In some demonstrative embodiments, controller 154 may be configured to control, cause and/or trigger radio 144 to transmit to device 102 a first CTS frame over the first channel and a second CTS frame over the second channel, for example, to indicate to device 102 that only the first and second channels are available to be used for bonding and/or to communicate the plurality of BRP frames between device 102 and 140.

In some demonstrative embodiments, device 102 may receive the first and second CTS frames over the first and second channels, respectively.

In some demonstrative embodiments, controller 124 may determine, based on the CTS frames, that only the first and second channels are available for bonding and/or to communicate the plurality of BRP frames between device 102 and 140.

In some demonstrative embodiments, controller 124 may be configured to control, cause and/or trigger radio 114 to communicate the plurality of BRP frames between device 102 and 140 over a bonded channel including the first and second channels, e.g., as described below.

Figure 4:
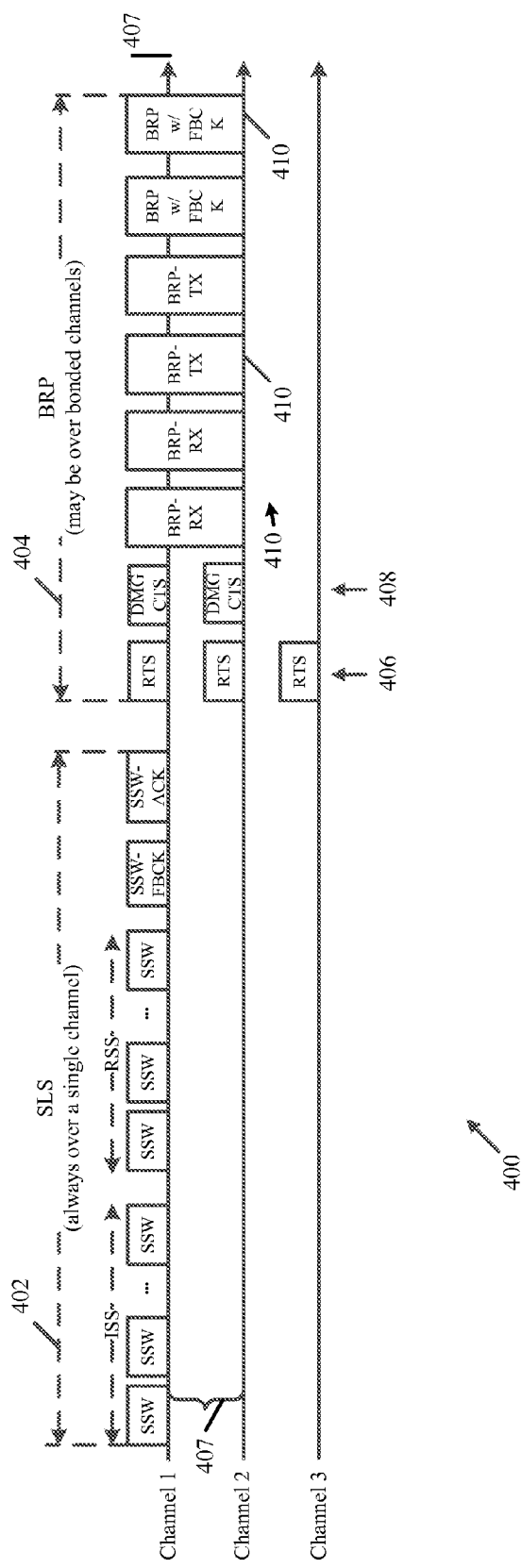
FIG. 4 is a schematic illustration of a beamforming protocol, in accordance with some demonstrative embodiments.

Reference is made to FIG. 4, which schematically illustrates a beamforming protocol 400, in accordance with some demonstrative embodiments. For example, one or more of the communications and/or operations of beamforming protocol 400 may be performed by first and second STAs, e.g., device 102 and/or device 140 (FIG. 1), to perform BF over a bonded channel, e.g., using channel bonding.

In some demonstrative embodiments, as shown in FIG. 4, the first and second STAs may performs an SLS phase 402 over a first channel, denoted Channel1, In some demonstrative embodiments, the Channel1 may include a single channel BW, e.g., a single 2.16 GHz channel or any other single channel BW.

In one example, SLS phase 402 may be performed over a single 2.16 GHz channel, for example, in accordance with an IEEE 802.11ad Specification.

In some demonstrative embodiments, following the completion of the SLS phase 402, the first and second STAs may select a sector for communication, e.g., sectors 312 and 314 (FIG. 3), respectively.

In some demonstrative embodiments, as shown in FIG. 4, the first and second STAs may perform a BRP phase 404, for example, after the selection of the sector for communication.

In some demonstrative embodiments, the first and second STAs may perform the BRP phase 404, for example, using the selected sectors, e.g., sectors 312 and 314 (FIG. 3).

In some demonstrative embodiments, the first STA, e.g., the initiator STA, may decide to use a bonded channel including two or more channels to communicate with the second STA, e.g., the responder STA.

In some demonstrative embodiments, the initiator STA and the responder STA may communicate one or more frames to protect/reserve the medium over the bonded channel.

As shown in FIG. 4, the initiator STA may transmit, e.g., simultaneously, two or more RTS frames 406 to the responder station to reserve the bonded channel.

As shown in FIG. 4, the initiator STA may transmit to the responder station a first RTS frame 406 over the channel1, a second RTS frame 406 over a second channel, denoted Channel2, and a third RTS frame 406 over a third channel, denoted Channel3, for example, to request to reserve Channel1, Channel2 and Channel3.

As shown in FIG. 4, the responder STA may transmit, e.g., simultaneously, one or more CTS frames 408 to the initiator station, e.g., to indicate the initiator station which channels of the requested channels are available for channel bonding.

As shown in FIG. 4, the responder STA may transmit to the initiator station a first CTS frame 408 over the Channel1, and a second CTS frame 408 over the Channel2, for example, to indicate to the initiator STA that Channel1 and Channel2 are available for communication over a bonded channel, and Channel3 is not available for channel bonding.

In some demonstrative embodiments, the first and second STAs may select to communicate over a bonded channel 407 including Channel1 and Channel2.

As shown in FIG. 4, the first and second STAs may communicate a plurality of BRP frames 410 over the bonded channel 407, e.g., including Channel1 and Channel2.

In some demonstrative embodiments, the exchange of the RTS frames 406 and/or CTS frames 408, may enable, for example, setting the NAV at one or more other stations, e.g., including legacy 11ad STAs, e.g., to cover the duration of BRP phase 204 over the bonded channel.

In some demonstrative embodiments, as shown in FIG. 4, the initiator may start to communicate the plurality of BRP frames 410 over the bonded channel 407, for example, following the RTS frames 406 and/or CTS frames 408 exchange.

Some demonstrative embodiments are described with respect to communication over a bonded channel 407 including two channels selected from three channels, e.g., as described above with respect to FIG. 4. However, in other embodiments any other number and/or arrangement of channels may be used to form the bonded channel.

Referring back to FIG. 1, in some demonstrative embodiments, controller 124 may cause, control and/or trigger radio 114 to communicate the BRP frames according to BRP protocol 400 (FIG. 1).

In some demonstrative embodiments, a BRP frame of the plurality of the BRP frames may be transmitted, for example, by transmitting a part of the BRP frame on a per single channel basis, and transmitting another part of the BRP frame over the bonded channel.

In some demonstrative embodiments, controller 124 may be configured to control, cause and/or trigger radio 114 to process communication of a separate duplicate of a first portion of a BRP frame over each one of the first and second channels.

In some demonstrative embodiments, controller 124 may be configured to control, cause and/or trigger radio 114 to process communication of a second portion of the BRP frame over the bonded channel.

In some demonstrative embodiments, controller 154 may be configured to control, cause and/or trigger radio 144 to process communication of the separate duplicate of the first portion of the BRP frame over each one of the first and second channels.

In some demonstrative embodiments, controller 154 may be configured to control, cause and/or trigger radio 144 to process communication of the second portion of the BRP frame over the bonded channel.

In some demonstrative embodiments, the second portion may include an automatic gain control field and/or a training field of the BRP frame.

In some demonstrative embodiments, transmitter 118 may transmit to device 140 a separate duplicate of a first portion of the BRP frame over each one of the first channel and the second channel, e.g., which form the bonded channel.

In some demonstrative embodiments, transmitter 118 may transmit to device 140 a second portion of the BRP frame including the automatic gain control field and/or the training field of the BRP frame over the bonded channel.

In some demonstrative embodiments, message processor 128 may generate and/or process the first and second portions of the BRP frame, and/or controller 124 may be configured to control, cause and/or trigger radio transmitter 118 to transmit the first and second portions of the BRP frame.

In some demonstrative embodiments, receiver 148 may receive from device 102 the separate duplicate of the first portion of the BRP frame over each of the first channel and the second channel of the bonded channel.

In some demonstrative embodiments, receiver 148 may receive from device 102 the second portion of the BRP frame including the automatic gain control field and/or the training field of the BRP frame over the bonded channel.

In some demonstrative embodiments, message processor may 158 may process the first and second portions of the BRP frames.

Figure 5:
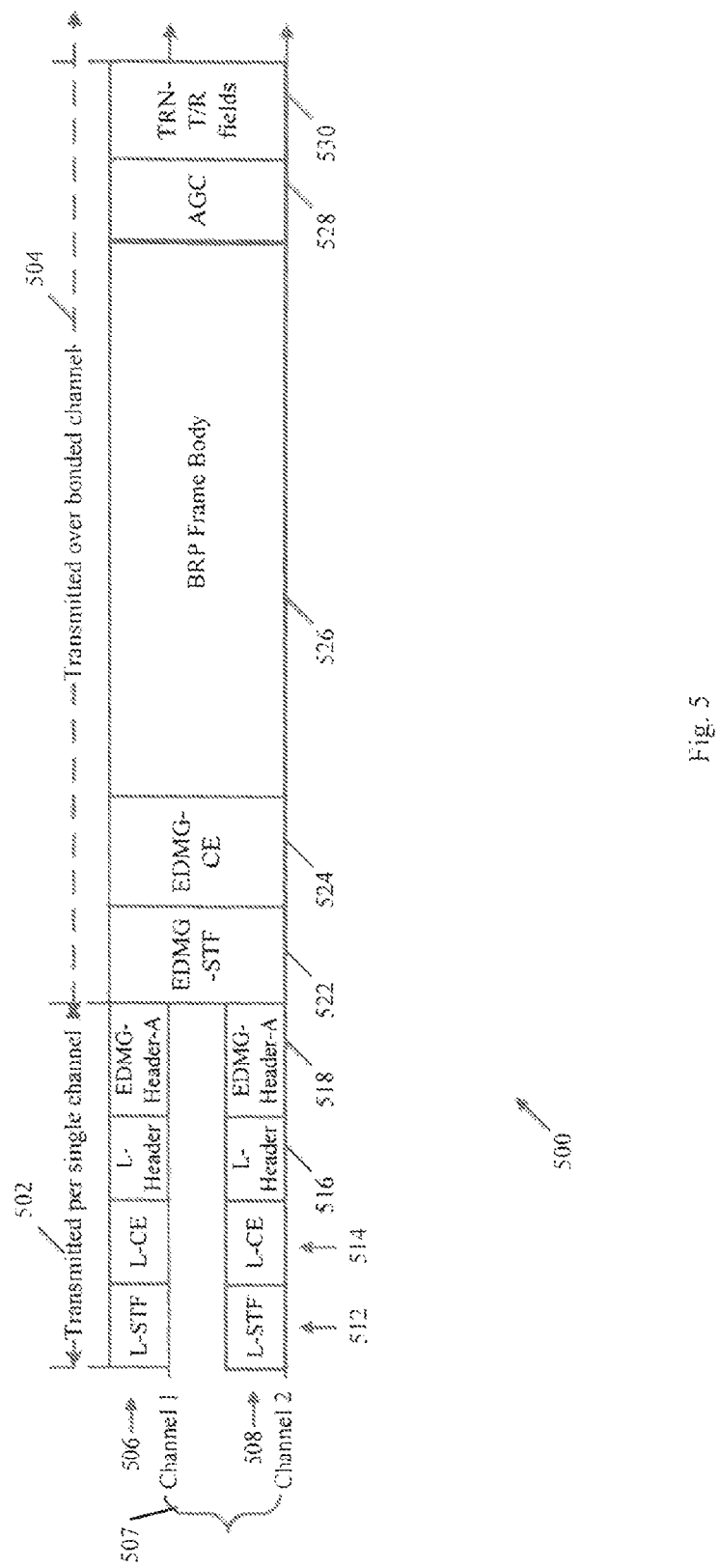
FIG. 5 is a schematic illustration of a BRP frame, in accordance with some demonstrative embodiments.

Reference is made to FIG. 5, which schematically illustrates a BRP frame 500, in accordance with some demonstrative embodiments.

In one example, BRP frame 500 may include BRP frame 408 (FIG. 4).

In one example, devices 102 (FIG. 1) and/or 140 (FIG. 1) may be configured to transmit and/or receive BRP frame 500, e.g., as part of BRP phase 404 (FIG. 4).

In some demonstrative embodiments, BRP frame 500 may include a BRP TX frame or a BRP Rx frame.

As shown in FIG. 5, BRP frame 500 may include a first portion 502, followed by a second portion 504.

As shown in FIG. 5, first portion 502 may be transmitted, for example, on a per single channel basis.

As shown in FIG. 5, first portion 502 may include a first duplicate 506 of the first portion 502 to be transmitted over a first channel, denoted Channel 1, and/or a second duplicate 508 of the first portion 502 to be transmitted over a second channel, denoted Channel 2.

As shown in FIG. 5, first duplicate 506 and second duplicate 508 of the portion 502 may include a plurality of fields, e.g., a Legacy Short Training Field (L-STF) 512, a Legacy Channel Estimation (L-CE) field 514, a Legacy Header field (L-Header) 516, an Extended DMG (EDMG) Header A (EDMG-Header-A) field 518.

In other embodiments, first duplicate 506 and second duplicate 508 of the portion 502 may include any other additional and/or alternative field.

In one example, transmission of the plurality of fields of first portion 502 may be performed over each of the channels, e.g., in duplicate. For example, the plurality of fields of first portion 502 may be transmitted over each of channel1 and Channel 2, e.g., simultaneously.

As shown in FIG. 5, second portion 504 may be transmitted, for example, over a bonded channel 507, e.g., including Channel 1 and Channel 2.

As shown in FIG. 5, second portion 504 may include an EDMG Short Training Field (EDMG-STF) 522, an EDMG Channel Estimation (EDMG-CE) field 524, the BRP frame body 526, an Automatic Gain Control (AGC) field, one or more Transmit Training (TRN-T) and/or Receive Training (TRN-R) fields (TRN-T/R fields) 530.

In other embodiments, second portion 504 may include any other additional and/or alternative field.

In some demonstrative embodiments, transmitting second portion 504 over the bonded channel, e.g., in particular the TRN-T/R fields 530, may, for example, allow the initiator and/or responder STAs to reach an AWV configuration that is based on the same set of bonded channels that will be used for the data transmission.

In some demonstrative embodiments, transmission of second portion 504 over the bonded channel 507 may be more efficient, e.g., since the BRP phase, e.g., BRP phase 404 (FIG. 4) is more efficient and less "noisy" than the SLS phase, e.g., SLS phase 402 (FIG. 4). For example, performing SLS phase 402 (FIG. 4) over the bonded channel 507 may potentially cause interference, e.g., severe interference.

Some demonstrative embodiments are described with respect to communication over a bonded channel, e.g., bonded channel 507, including two channels, e.g., as described above with respect to FIG. 5. However, in other embodiments any other number of channels may form the bonded channel.

Referring back to FIG. 1, in some demonstrative embodiments, one or more elements of a BRP frame, e.g., BRP frame 500 (FIG. 5), may be configured, modified and/or adjusted based on a number of channels, which form the bonded channel, e.g., as described below.

In some demonstrative embodiments, controller 124 may be configured to control, cause and/or trigger radio 114 and/or message processor 128 to generate a BRP frame, e.g., BRP frame 500 (FIG. 5), including a training field, TRN-T/R fields 530 (FIG. 5) comprising a plurality of Golay sequences.

In some demonstrative embodiments, a length of a Golay sequence of the plurality of Golay sequences may be based on the number of channels in the bonded channel, e.g., bonded channel 507 (FIG. 5). For example, the length of the Golay sequence may be based on the quantity, the count, and/or the sum of channels forming the bonded channel, e.g., bonded channel 507 (FIG. 5). For example, controller 124 (FIG. 1) and/or controller 154 (FIG. 1) may be configured to determine and/or set the length of the Golay sequence based, at least on the quantity, the count, and/or the sum of channels forming the bonded channel.

In one example, the plurality of Golay sequences may include one or more Golay sequences having a length of 1024, for example, if the bonded channel includes two channels; and/or the plurality of Golay sequences may include one or more Golay sequences having a length of 2048, for example, if the bonded channel includes three channels, e.g., as described below with reference to FIG. 6.

Figure 6:
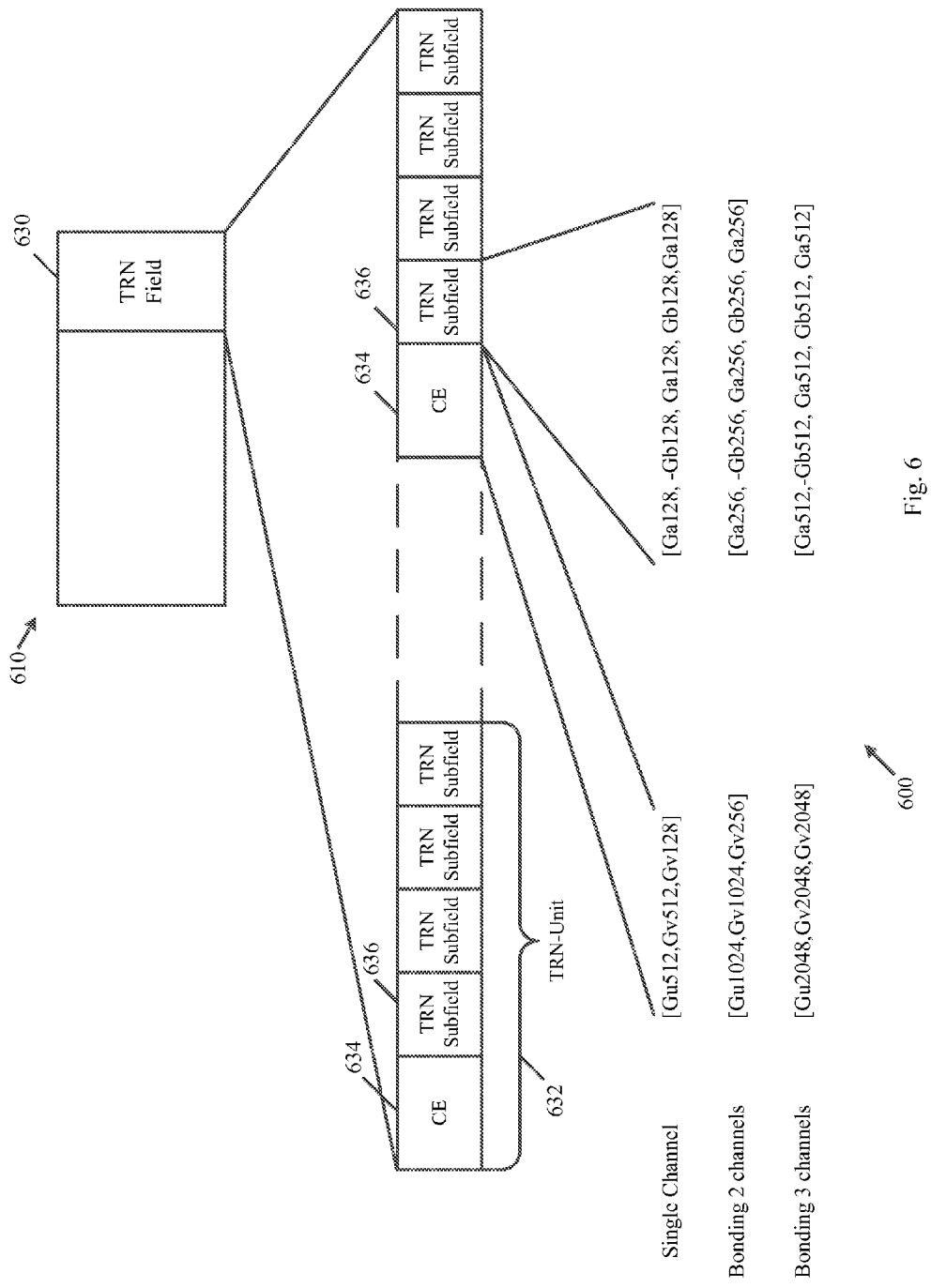
FIG. 6 is a schematic illustration of a training field of a BRP frame, in accordance with some demonstrative embodiments.

Reference is made to FIG. 6, which schematically illustrates a structure 600 of a training (TRN) field 630 of a BRP frame 610, in accordance with some demonstrative embodiments.

In one example, training field 630 of a BRP frame 610 may perform the functionality of TRN-T/R fields 530 of BRP frame 500 (FIG. 5).

In one example, devices 102 (FIG. 1) and/or 140 (FIG. 1) may be configured to transmit and/or receive BRP frame 610 including TRN field 630, e.g., as part of BRP phase 404 (FIG. 4).

As shown in FIG. 6, TRN field 630 may include a plurality of TRN units 632.

As shown in FIG. 6, a TRN unit 632 may include a channel estimate (CE) field 634, and a plurality of training subfields 636.

As shown in FIG. 6, CE field 634 may include a plurality of Golay sequences, e.g., as described below.

As shown in FIG. 6, a training subfield 636 may include a plurality of Golay sequences, e.g., as described below.

In one example, the plurality of Golay sequences in TRN field 630 may be configured to be used for estimating the bonded channel and/or to be used for beamforming training, e.g., as part of the BRP phase.

As shown in FIG. 6, CE field 634 may include a plurality of Golay sequences, for example, the Golay sequences [Gu512, Gv512, Gv128], e.g., if BRP frame 610 is to be communicated over a single non-bonded channel.

In some demonstrative embodiments, the Golay sequences Gu512, Gv512 may include Golay sequences having a length of 512, and/or the Golay sequence Gv128 may include a Golay sequence having a length of 128.

In some demonstrative embodiments, the Golay sequences Gu512, Gv512 and/or Gv128 may include one or more Golay sequences having a length of 128, e.g., the Golay Sequences Ga128 and/or Gb128.

In some demonstrative embodiments, the Golay Sequences Ga128 and/or Gb128 may include complementary Golay Sequences, e.g., as defined by an IEEE 802.11 Specification.

In some demonstrative embodiments, the Golay sequences Gu512, Gv512 and/or Gv128 may include the Golay sequences Ga128 and/or Gb128, e.g., as follows:

Gu512=[Gb128, −Ga128, Gb128, −Ga128]
Gv512=[Gb128, Ga128, −Gb128, −Ga128]
Gv128=[−Gb128]

As shown in FIG. 6, CE field 634 may include a plurality of Golay sequences, for example, the Golay sequences [Gu1024,Gv1024,Gv256], e.g., when BRP frame 610 is to be communicated over a bonded channel formed by two channels.

In some demonstrative embodiments, the Golay sequences Gu1024, Gv1024 may include Golay sequences having a length of 1024, and/or the Golay sequence Gv256 may include a Golay sequence having a length of 256.

In some demonstrative embodiments, the Golay sequences Gu1024, Gv1024 and/or Gv256 may include one or more Golay sequences having a length of 256, e.g., the Golay Sequences Ga256 and/or Gb256.

In some demonstrative embodiments, the Golay Sequences Ga256 and/or Gb256 may include complementary Golay Sequences, which may include the Golay sequences Ga128 and/or Gb128, e.g., as follows:

Ga256=[Ga128,Gb128]
Gb256=[Ga128,−Gb128]

In other embodiments, the Golay Sequences Ga256 and/or Gb256 may include any other combination of Golay sequences forming a Golay sequence having a length of 256.

In some demonstrative embodiments, the Golay sequences Gu1024, Gv1024 and/or Gv256 may include the Golay sequences Ga256 and/or Gb256, e.g., as follows:

Gu1024=[Gb256, −Ga256, Gb256, −Ga256]
Gv1024=[Gb256, Ga256, −Gb256, −Ga256]
Gv256=[−Gb256]

As shown in FIG. 6, CE field 634 may include a plurality of Golay sequences, for example, the Golay sequences [Gu2048,Gv2048,Gv512], e.g., when BRP frame 610 is to be communicated over a bonded channel formed by three channels.

In some demonstrative embodiments, the Golay sequences Gu2048, Gv2048 may include Golay sequences having a length of 2048, and/or the Golay sequence Gv512 may include a Golay sequence having a length of 512.

In some demonstrative embodiments, the Golay sequences Gu2048, Gv2048 and/or Gv512 may include one or more Golay sequences having a length of 512, e.g., the Golay Sequences Ga512 and/or Gb512.

In some demonstrative embodiments, the Golay Sequences Ga512 and/or Gb512 may include complementary Golay Sequences, which may include the Golay sequences Ga256 and/or Gb256, e.g., as follows:

Ga512=[Ga256,Gb256]
Gb512=[Ga256,−Gb256]

In some demonstrative embodiments, the Golay sequences Gu2048, Gv2048 and/or Gv512 may include the Golay sequences Ga512 and/or Gb512, e.g., as follows:

Gu2048=[Gb512, −Ga512, Gb512, −Ga512]
Gv2048=[Gb512, Ga512, −Gb512, −Ga512]
Gv512=[−Gb512]

In other embodiments, CE subfield 634 may include any other configuration and/or combination of Golay sequences, and/or Golay sequences which may have any other length, which may, for example, be based on the number of channels forming a bonded channel over which BRP frame 610 is to be communicated.

As shown in FIG. 6, TRN subfield 636 may include a plurality of Golay sequences, for example, the Golay sequences [Ga128,−Gb128,Ga128,Gb128,Ga128], e.g., when BRP frame 610 is top be communicated over a single non-bonded channel.

As shown in FIG. 6, TRN subfield 636 may include a plurality of Golay sequences, for example, the Golay sequences [Ga256, −Gb256, Ga256, Gb256, Ga256], e.g., when BRP frame 610 is top be communicated over a bonded channel formed by two channels.

As shown in FIG. 6, TRN subfield 636 may include a plurality of Golay sequences, for example, the Golay sequences [Ga512, −Gb512, Ga512, Gb512, Ga512], for example, when BRP frame 610 is top be communicated over a bonded channel formed by three channels.

In some demonstrative embodiments, alternatively, TRN subfield 636 may include three repetitions of the Golay sequences [Ga128, −Gb128, Ga128, Gb128, Ga128], e.g., the Golay sequences being used for the single non-bonded channel, for example, when BRP frame 610 is top be communicated over a bonded channel formed by three channels.

In other embodiments, TRN subfield 636 may include any other configuration and/or combination of Golay sequences, and/or Golay sequences which may have any other length, which may, for example, be based on the number of channels forming a bonded channel over which BRP frame 610 is to be communicated.

Figure 7:
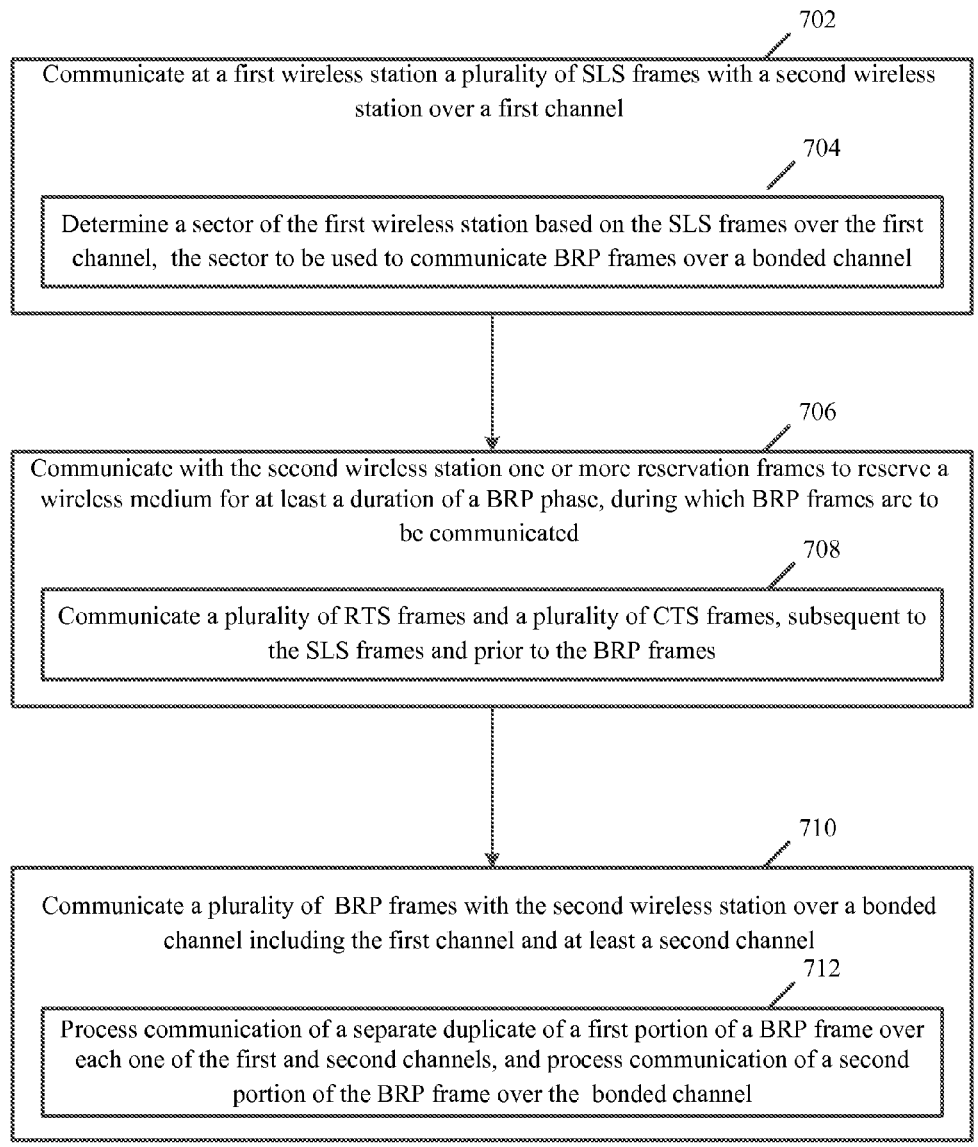
FIG. 7 is a schematic flow-chart illustration of a method of beamforming, in accordance with some demonstrative embodiments.

Reference is made to FIG. 7, which schematically illustrates a method of beamforming, in accordance with some demonstrative embodiments. For example, one or more of the operations of the method of FIG. 7 may be performed by one or more elements of a system, e.g., system 100 (FIG. 1), for example, one or more wireless devices, e.g., device 102 (FIG. 1), and/or device 140 (FIG. 1); a controller, e.g., controller 154 (FIG. 1), and/or controller 124 (FIG. 1); a radio, e.g., radio 114 (FIG. 1), and/or radio 144 (FIG. 1); a transmitter, e.g., transmitter 118 (FIG. 1), and/or transmitter 148 (FIG. 1); a receiver e.g., receiver 116 (FIG. 1), and/or receiver 146 (FIG. 1); and/or a message processor, e.g., message processor 128 (FIG. 1), and/or message processor 158 (FIG. 1).

As indicated at block 702, the method may include communicating at a first wireless station a plurality of Sector Level Sweep (SLS) frames with a second wireless station over a first channel. For example, device 102 (FIG. 1) may communicate the plurality of SLS frames with device 140 (FIG. 1) over the first channel, e.g., as described above.

As indicated at block 704, communicating the SLS frames may include determining a sector of the first wireless station based on the SLS frames over the first channel, the sector to be used communicate BRP frames over a bonded channel. For example, controller 124 (FIG. 1) may determine sector 312 (FIG. 3) over the first channel and may select to use sector 312 (FIG. 3) to communicate the BRP frames with device 140 (FIG. 1) over the bonded channel, e.g., as described above.

As indicated at block 706, the method may include communicating with the second wireless station one or more reservation frames to reserve a wireless medium for at least a duration of a BRP phase during which the BRP frames are to be communicated. For example, device 102 (FIG. 1) may communicate the one or more reservation frames to reserve wireless medium 103 (FIG. 1) for at least the duration of the BRP phase 404 (FIG. 4), e.g., as described above.

As indicated at block 708, communicating the one or more reservation frames may include communicating a plurality of Request to Send (RTS) frames, and a plurality of Clear to Send (CTS) frames, e.g., subsequent to the SLS frames and prior to the BRP frames. For example, device 102 (FIG. 1) may communicate with device 140 (FIG. 1) the RTS frames 406 (FIG. 4) and the CTS frames 408 (FIG. 4), for example, subsequent to the SLS phase 402 (FIG. 4) and prior to the BRP frames 410 (FIG. 4), e.g., as described above.

As indicated at block 710, the method may include communicating the plurality of BRP frames over the bonded channel including the first channel and at least a second channel. For example, device 102 (FIG. 1) may communicate the plurality of BRP frames with device 140 (FIG. 1) over the bonded channel including the first channel and the second channel, e.g., as described above.

As indicated at block 710, communicating the plurality of BRP frames may include processing communication of a separate duplicate of a first portion of a BRP frame over each one of the first and second channels, and processing communication of a second portion of the BRP frame over the bonded channel. For example, device 102 (FIG. 1) may process communication of duplicates 506 and 508 (FIG. 5) of first portion 502 (FIG. 5) of BRP frame 500 (FIG. 5) over each of Channel 1 and Channel 2, and device 102 (FIG. 1) may process communication of second portion 504 (FIG. 5)

of BRP frame 500 (FIG. 5) over bonded channel 512 including Channel 1 and Channel 2, e.g., as described above.

Figure 8:
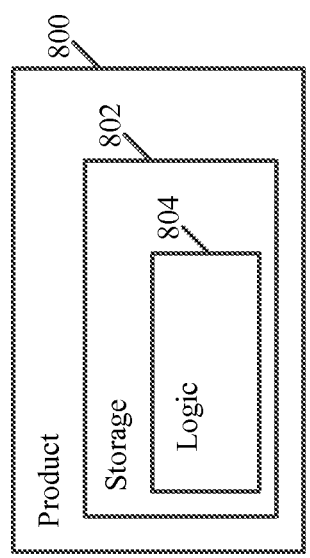
FIG. 8 is a schematic illustration of a product of manufacture, in accordance with some demonstrative embodiments.

Reference is made to FIG. 8, which schematically illustrates a product of manufacture 800, in accordance with some demonstrative embodiments. Product 800 may include a non-transitory machine-readable storage medium 802 to store logic 804, which may be used, for example, to perform at least part of the functionality of device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), controller 124 (FIG. 1), controller 154 (FIG. 1), message processor 128 (FIG. 1), and/or message processor 158 (FIG. 1), and/or to perform one or more of the operations and/or communications according to FIGS. 2, 3A, 3B, 4, 5 and/or 6, and/or to perform one or more operations of the method of FIG. 7, and/or one or more operations described herein. The phrase "non-transitory machine-readable medium" is directed to include all computer-readable media, with the sole exception being a transitory propagating signal.

In some demonstrative embodiments, product 800 and/or machine-readable storage medium 802 may include one or more types of computer-readable storage media capable of storing data, including volatile memory, non-volatile memory, removable or non-removable memory, erasable or non-erasable memory, writeable or re-writeable memory, and the like. For example, machine-readable storage medium 802 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 804 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 804 may include, or may be implemented as, software, firmware, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising circuitry configured to cause a first wireless station to communicate a plurality of Sector Level Sweep (SLS) frames with a second wireless station over a first channel; and communicate a plurality of Beam Refinement Protocol (BRP) frames with the second wireless station over a bonded channel comprising the first channel and at least a second channel.

Example 2 includes the subject matter of Example 1, and optionally, wherein the apparatus is configured to cause the first wireless station to communicate with the second wireless station one or more reservation frames to reserve a wireless medium for at least a duration of a BRP phase, during which the BRP frames are to be communicated.

Example 3 includes the subject matter of Example 2, and optionally, wherein the apparatus is configured to cause the first wireless station to communicate the reservation frames over a plurality of channels comprising at least the first and second channels.

Example 4 includes the subject matter of any one of Examples 1-3, and optionally, wherein the apparatus is configured to cause the first wireless station to communicate a plurality of Request to Send (RTS) frames and a plurality of Clear to Send (CTS) frames, subsequent to the SLS frames and prior to the BRP frames.

Example 5 includes the subject matter of Example 4, and optionally, wherein the apparatus is configured to cause the first wireless station to communicate the plurality of RTS frames over a respective plurality of channels comprising at least the first and second channels, and to communicate two or more CTS frames over respective ones of the first and second channels.

Example 6 includes the subject matter of Example 5, and optionally, wherein the plurality of channels comprises one or more channels in addition to the first and second channels.

Example 7 includes the subject matter of any one of Examples 1-6, and optionally, wherein the apparatus is configured to cause the first wireless station to process communication of a separate duplicate of a first portion of a BRP frame over each one of the first and second channels, and to process communication of a second portion of the BRP frame over the bonded channel.

Example 8 includes the subject matter of Example 7, and optionally, wherein the second portion comprises at least one field selected from the group consisting of an automatic gain control filed, and a training field.

Example 9 includes the subject matter of any one of Examples 1-8, and optionally, wherein the apparatus is configured to cause the first wireless station to generate a BRP frame of the plurality of BRP frames comprising a training field comprising a plurality of Golay sequences, a length of a Golay sequence of the plurality of Golay sequences is based on the number of channels in the bonded channel.

Example 10 includes the subject matter of any one of Examples 1-9, and optionally, wherein the apparatus is configured to cause the first wireless station to determine a sector of the first wireless station based on the SLS frames over the first channel, and to use the sector to communicate the BRP frames over the bonded channel.

Example 11 includes the subject matter of any one of Examples 1-10, and optionally, wherein the bonded channel comprises at least the first channel, the second channel, and a third channel, the first channel between the second channel and the third channel.

Example 12 includes the subject matter of any one of Examples 1-11, and optionally, wherein the first channel comprises a 2.16 Gigahertz (GHz) channel.

Example 13 includes the subject matter of any one of Examples 1-12, and optionally, wherein the first wireless station is a Directional Multi-Gigabit (DMG) Station (STA).

Example 14 includes the subject matter of any one of Examples 1-13, and optionally, comprising a radio to communicate the SLS frames and the BRP frames.

Example 15 includes the subject matter of any one of Examples 1-14, and optionally, comprising one or more directional antennas, a memory, and a processor.

Example 16 includes a system of wireless communication comprising a first wireless station, the first wireless station comprising one or more antennas; a memory; a processor; and a radio configured to communicate a plurality of Sector Level Sweep (SLS) frames with a second wireless station over a first channel, and to communicate a plurality of Beam Refinement Protocol (BRP) frames with the second wireless station over a bonded channel comprising the first channel and at least a second channel.

Example 17 includes the subject matter of Example 16, and optionally, wherein the first wireless station is to communicate with the second wireless station one or more reservation frames to reserve a wireless medium for at least a duration of a BRP phase, during which the BRP frames are to be communicated.

Example 18 includes the subject matter of Example 17, and optionally, wherein the first wireless station is to communicate the reservation frames over a plurality of channels comprising at least the first and second channels.

Example 19 includes the subject matter of any one of Examples 16-18, and optionally, wherein the first wireless station is to communicate a plurality of Request to Send (RTS) frames and a plurality of Clear to Send (CTS) frames, subsequent to the SLS frames and prior to the BRP frames.

Example 20 includes the subject matter of Example 19, and optionally, wherein the first wireless station is to communicate the plurality of RTS frames over a respective plurality of channels comprising at least the first and second channels, and to communicate two or more CTS frames over respective ones of the first and second channels.

Example 21 includes the subject matter of Example 20, and optionally, wherein the plurality of channels comprises one or more channels in addition to the first and second channels.

Example 22 includes the subject matter of any one of Examples 16-21, and optionally, wherein the first wireless station is to process communication of a separate duplicate of a first portion of a BRP frame over each one of the first and second channels, and to process communication of a second portion of the BRP frame over the bonded channel.

Example 23 includes the subject matter of Example 22, and optionally, wherein the second portion comprises at least one field selected from the group consisting of an automatic gain control filed, and a training field.

Example 24 includes the subject matter of any one of Examples 16-23, and optionally, wherein the first wireless station is to generate a BRP frame of the plurality of BRP frames comprising a training field comprising a plurality of Golay sequences, a length of a Golay sequence of the plurality of Golay sequences is based on the number of channels in the bonded channel.

Example 25 includes the subject matter of any one of Examples 16-24, and optionally, wherein the first wireless station is to determine a sector of the first wireless station based on the SLS frames over the first channel, and to use the sector to communicate the BRP frames over the bonded channel.

Example 26 includes the subject matter of any one of Examples 16-25, and optionally, wherein the bonded channel comprises at least the first channel, the second channel, and a third channel, the first channel between the second channel and the third channel.

Example 27 includes the subject matter of any one of Examples 16-26, and optionally, wherein the first channel comprises a 2.16 Gigahertz (GHz) channel.

Example 28 includes the subject matter of any one of Examples 16-27, and optionally, wherein the first wireless station is a Directional Multi-Gigabit (DMG) Station (STA).

Example 29 includes a method to be performed at a first wireless station, the method comprising communicating a plurality of Sector Level Sweep (SLS) frames with a second wireless station over a first channel; and communicating a plurality of Beam Refinement Protocol (BRP) frames with the second wireless station over a bonded channel comprising the first channel and at least a second channel.

Example 30 includes the subject matter of Example 29, and optionally, comprising communicating with the second wireless station one or more reservation frames to reserve a wireless medium for at least a duration of a BRP phase, during which the BRP frames are to be communicated.

Example 31 includes the subject matter of Example 30, and optionally, comprising communicating the reservation frames over a plurality of channels comprising at least the first and second channels.

Example 32 includes the subject matter of any one of Examples 29-31, and optionally, comprising communicating a plurality of Request to Send (RTS) frames and a plurality of Clear to Send (CTS) frames, subsequent to the SLS frames and prior to the BRP frames.

Example 33 includes the subject matter of Example 32, and optionally, comprising communicating the plurality of RTS frames over a respective plurality of channels comprising at least the first and second channels, and communicating two or more CTS frames over respective ones of the first and second channels.

Example 34 includes the subject matter of Example 33, and optionally, wherein the plurality of channels comprises one or more channels in addition to the first and second channels.

Example 35 includes the subject matter of any one of Examples 29-34, and optionally, comprising processing communication of a separate duplicate of a first portion of a BRP frame over each one of the first and second channels, and processing communication of a second portion of the BRP frame over the bonded channel.

Example 36 includes the subject matter of Example 35, and optionally, wherein the second portion comprises at least one field selected from the group consisting of an automatic gain control filed, and a training field.

Example 37 includes the subject matter of any one of Examples 29-36, and optionally, comprising generating a BRP frame of the plurality of BRP frames comprising a training field comprising a plurality of Golay sequences, a length of a Golay sequence of the plurality of Golay sequences is based on the number of channels in the bonded channel.

Example 38 includes the subject matter of any one of Examples 29-37, and optionally, comprising determining a sector of the first wireless station based on the SLS frames over the first channel, and using the sector to communicate the BRP frames over the bonded channel.

Example 39 includes the subject matter of any one of Examples 29-38, and optionally, wherein the bonded channel comprises at least the first channel, the second channel, and a third channel, the first channel between the second channel and the third channel.

Example 40 includes the subject matter of any one of Examples 29-39, and optionally, wherein the first channel comprises a 2.16 Gigahertz (GHz) channel.

Example 41 includes the subject matter of any one of Examples 29-40, and optionally, wherein the first wireless station is a Directional Multi-Gigabit (DMG) Station (STA).

Example 42 includes a product comprising one or more tangible computer-readable non-transitory storage media comprising computer-executable instructions operable to, when executed by at least one computer processor, enable the at least one computer processor to implement one or more operations at a first wireless station, the operations comprising communicating a plurality of Sector Level Sweep (SLS) frames with a second wireless station over a first channel; and communicating a plurality of Beam Refinement Protocol (BRP) frames with the second wireless station over a bonded channel comprising the first channel and at least a second channel.

Example 43 includes the subject matter of Example 42, and optionally, wherein the operations comprise communicating with the second wireless station one or more reservation frames to reserve a wireless medium for at least a duration of a BRP phase, during which the BRP frames are to be communicated.

Example 44 includes the subject matter of Example 43, and optionally, wherein the operations comprise communicating the reservation frames over a plurality of channels comprising at least the first and second channels.

Example 45 includes the subject matter of any one of Examples 42-44, and optionally, wherein the operations comprise communicating a plurality of Request to Send (RTS) frames and a plurality of Clear to Send (CTS) frames, subsequent to the SLS frames and prior to the BRP frames.

Example 46 includes the subject matter of Example 45, and optionally, wherein the operations comprise communicating the plurality of RTS frames over a respective plurality of channels comprising at least the first and second channels, and communicating two or more CTS frames over respective ones of the first and second channels.

Example 47 includes the subject matter of Example 46, and optionally, wherein the plurality of channels comprises one or more channels in addition to the first and second channels.

Example 48 includes the subject matter of any one of Examples 42-47, and optionally, wherein the operations comprise processing communication of a separate duplicate of a first portion of a BRP frame over each one of the first and second channels, and processing communication of a second portion of the BRP frame over the bonded channel.

Example 49 includes the subject matter of Example 48, and optionally, wherein the second portion comprises at least one field selected from the group consisting of an automatic gain control filed, and a training field.

Example 50 includes the subject matter of any one of Examples 42-49, and optionally, wherein the operations comprise generating a BRP frame of the plurality of BRP frames comprising a training field comprising a plurality of Golay sequences, a length of a Golay sequence of the plurality of Golay sequences is based on the number of channels in the bonded channel.

Example 51 includes the subject matter of any one of Examples 42-50, and optionally, wherein the operations comprise determining a sector of the first wireless station based on the SLS frames over the first channel, and using the sector to communicate the BRP frames over the bonded channel.

Example 52 includes the subject matter of any one of Examples 42-51, and optionally, wherein the bonded channel comprises at least the first channel, the second channel, and a third channel, the first channel between the second channel and the third channel.

Example 53 includes the subject matter of any one of Examples 42-52, and optionally, wherein the first channel comprises a 2.16 Gigahertz (GHz) channel.

Example 54 includes the subject matter of any one of Examples 42-53, and optionally, wherein the first wireless station is a Directional Multi-Gigabit (DMG) Station (STA).

Example 55 includes an apparatus of wireless communication by a first wireless station, the apparatus comprising means for communicating a plurality of Sector Level Sweep (SLS) frames with a second wireless station over a first channel; and means for communicating a plurality of Beam Refinement Protocol (BRP) frames with the second wireless station over a bonded channel comprising the first channel and at least a second channel.

Example 56 includes the subject matter of Example 55, and optionally, comprising means for communicating with the second wireless station one or more reservation frames to reserve a wireless medium for at least a duration of a BRP phase, during which the BRP frames are to be communicated.

Example 57 includes the subject matter of Example 56, and optionally, comprising means for communicating the reservation frames over a plurality of channels comprising at least the first and second channels.

Example 58 includes the subject matter of any one of Examples 55-57, and optionally, comprising means for communicating a plurality of Request to Send (RTS) frames and a plurality of Clear to Send (CTS) frames, subsequent to the SLS frames and prior to the BRP frames.

Example 59 includes the subject matter of Example 58, and optionally, comprising means for communicating the plurality of RTS frames over a respective plurality of channels comprising at least the first and second channels, and communicating two or more CTS frames over respective ones of the first and second channels.

Example 60 includes the subject matter of Example 59, and optionally, wherein the plurality of channels comprises one or more channels in addition to the first and second channels.

Example 61 includes the subject matter of any one of Examples 55-60, and optionally, comprising means for processing communication of a separate duplicate of a first portion of a BRP frame over each one of the first and second channels, and processing communication of a second portion of the BRP frame over the bonded channel.

Example 62 includes the subject matter of Example 61, and optionally, wherein the second portion comprises at least one field selected from the group consisting of an automatic gain control filed, and a training field.

Example 63 includes the subject matter of any one of Examples 55-62, and optionally, comprising means for generating a BRP frame of the plurality of BRP frames comprising a training field comprising a plurality of Golay sequences, a length of a Golay sequence of the plurality of Golay sequences is based on the number of channels in the bonded channel.

Example 64 includes the subject matter of any one of Examples 55-63, and optionally, comprising means for determining a sector of the first wireless station based on the SLS frames over the first channel, and means for using the sector to communicate the BRP frames over the bonded channel.

Example 65 includes the subject matter of any one of Examples 55-64, and optionally, wherein the bonded channel comprises at least the first channel, the second channel, and a third channel, the first channel between the second channel and the third channel.

Example 66 includes the subject matter of any one of Examples 55-65, and optionally, wherein the first channel comprises a 2.16 Gigahertz (GHz) channel Example 67 includes the subject matter of any one of Examples 55-66, and optionally, wherein the first wireless station is a Directional Multi-Gigabit (DMG) Station (STA).

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. A wireless device comprising memory circuitry, and one or more processors, the wireless device being a first wireless device, the one or more processors to:
   perform a beamforming protocol with a second wireless device, performing the beamforming protocol including:
      causing communication of Sector Sweep (SSW) messages with the second wireless device over a first wireless channel during a Sector Level Sweep (SLS) phase of the beamforming protocol; and
      causing communication of Beam Refinement Protocol (BRP) frames with the second wireless device during a BRP phase of the beamforming protocol, wherein a BRP frame of the BRP frames includes a first portion and a second portion, causing communication of BRP frames including:
         causing communication of a duplicate of the first portion over each one of the first wireless channel and a second wireless channel;
         causing communication of the second portion over a bonded channel comprising the first wireless channel and the second wireless channel;
   select a beam direction for data communication between the first wireless device and the second wireless device based on the beamforming protocol; and
   cause communication over a millimeter-Wave (mmWave) wireless band between the first wireless device and the second wireless device based on the beam direction.

2. The wireless device of claim 1, wherein:
   the BRP frame is an Extended Directional Multi-Gigabit (EDMG) frame;
   the first portion includes:
      a Legacy Short Training Field;
      a Legacy Channel Estimation field;
      a Legacy Header field;
      an EDMG Header; and
   the second portion includes a Training (TRN) field including a plurality of training units (TRN Units).

3. The wireless device of claim 2, wherein each TRN Unit of the plurality of TRN Units includes a plurality of training subfields (TRN subfields), each TRN subfield of the plurality of TRN subfields including a plurality of Golay sequences.

4. The wireless device of claim 3, wherein a length of each Golay sequence of the plurality of Golay sequences is based on a quantity of bonded channels.

5. The wireless device of claim 3, wherein a length of a Golay sequence of the plurality of Golay sequences includes a length selected from the group consisting of 128, 256, and 512.

6. The wireless device of claim 1, wherein the second portion comprises a Training (TRN) field.

7. The wireless device of claim 1, wherein the first wireless device is a beamforming initiator, and the second wireless device is a beamforming responder.

8. The wireless device of claim 1, wherein the first wireless device is a beamforming responder, and the second wireless device is a beamforming initiator.

9. The wireless device of claim 1, wherein the one or more processors are to cause Multi-User Multiple-Input Multiple-Output (MU-MIMO) communication over a millimeter-Wave (mmWave) wireless band between the first wireless device, the second wireless device and other wireless devices based on the beam directions.

10. The wireless device of claim 1, further including a radio, a memory unit, and a processor coupled to the memory unit and configured to perform instructions of an Operating System (OS).

11. The wireless device of claim 10, further including a plurality of directional antennas coupled to the radio.

12. A product comprising one or more tangible computer-readable non-transitory storage media comprising computer-executable instructions operable to, when executed by at least one computer processor, cause a first wireless device to:
   perform a beamforming protocol with a second wireless device, performing the beamforming protocol including:
      causing communication of Sector Sweep (SSW) messages with the second wireless device over a first wireless channel during a Sector Level Sweep (SLS) phase of the beamforming protocol; and
      causing communication of Beam Refinement Protocol (BRP) frames with the second wireless device during a BRP phase of the beamforming protocol, wherein a BRP frame of the BRP frames includes a first portion and a second portion, causing communication of BRP frames including:
         causing communication of a duplicate of the first portion over each one of the first wireless channel and a second wireless channel;
         causing communication of the second portion over a bonded channel comprising the first wireless channel and the second wireless channel;
   select a beam direction for data communication between the first wireless device and the second wireless device based on the beamforming protocol; and
   cause communication over a millimeter-Wave (mmWave) wireless band between the first wireless device and the second wireless device based on the beam direction.

13. The product of claim 12, wherein:
the BRP frame is an Extended Directional Multi-Gigabit (EDMG) frame;
the first portion includes:
   a Legacy Short Training Field;
   a Legacy Channel Estimation field;
   a Legacy Header field;
   an EDMG Header; and
the second portion includes a Training (TRN) field including a plurality of training units (TRN Units).

14. The product of claim 13, wherein each TRN Unit of the plurality of TRN Units includes a plurality of training subfields (TRN subfields), each TRN subfield of the plurality of TRN subfields including a plurality of Golay sequences, wherein a length of each Golay sequence of the plurality of Golay sequences is based on a quantity of bonded channels.

15. The product of claim 14, wherein a length of a Golay sequence of the plurality of Golay sequences includes a length selected from the group consisting of 128, 256, and 512.

16. The product of claim 12, wherein the second portion comprises a Training (TRN) field.

17. The product of claim 12, wherein the computer-executable instructions are operable to, when executed by at least one computer processor, cause the first wireless device to transmit a Multi-User Multiple-Input Multiple-Output (MU-MIMO) communication over a millimeter-Wave (mm-Wave) wireless band between the first wireless device, the second wireless device and other wireless devices based on the beam directions.

18. A method to be performed at a first wireless device, the method including:
   performing a beamforming protocol with a second wireless device, performing the beamforming protocol including:
      causing communication of Sector Sweep (SSW) messages with the second wireless device over a first wireless channel during a Sector Level Sweep (SLS) phase of the beamforming protocol; and
      causing communication of Beam Refinement Protocol (BRP) frames with the second wireless device during a BRP phase of the beamforming protocol, wherein a BRP frame of the BRP frames includes a first portion and a second portion, causing communication of BRP frames including:
         causing communication of a duplicate of the first portion over each one of the first wireless channel and a second wireless channel;
         causing communication of the second portion over a bonded channel comprising the first wireless channel and the second wireless channel;
   selecting a beam direction for data communication between the first wireless device and the second wireless device based on the beamforming protocol; and
   causing communication over a millimeter-Wave (mm-Wave) wireless band between the first wireless device and the second wireless device based on the beam direction.

19. The method of claim 18, wherein:
the BRP frame is an Extended Directional Multi-Gigabit (EDMG) frame;
the first portion includes:
   a Legacy Short Training Field;
   a Legacy Channel Estimation field;
   a Legacy Header field;
   an EDMG Header; and
the second portion includes a Training (TRN) field including a plurality of training units (TRN Units).

20. The method of claim 19, wherein each TRN Unit of the plurality of TRN Units includes a plurality of training subfields (TRN subfields), each TRN subfield of the plurality of TRN subfields including a plurality of Golay sequences, and wherein a length of each Golay sequence of the plurality of Golay sequences is based on a quantity of bonded channels.

21. The method of claim 20, wherein a length of a Golay sequence of the plurality of Golay sequences includes a length selected from the group consisting of 128, 256, and 512.

22. The method of claim 18, wherein the second portion comprises a Training (TRN) field.

23. The method of claim 18, wherein the first wireless device is a beamforming initiator, and the second wireless device is a beamforming responder.

24. The method of claim 18, wherein the first wireless device is a beamforming responder, and the second wireless device is a beamforming initiator.

25. The method of claim 18, further including causing transmission of a Multi-User Multiple-Input Multiple-Output (MU-MIMO) communication over a millimeter-Wave (mmWave) wireless band between the first wireless device, the second wireless device and other wireless devices based on the beam directions.

* * * * *